United States Patent
Feinberg et al.

(10) Patent No.: US 9,763,470 B2
(45) Date of Patent: Sep. 19, 2017

(54) TWO STAGE COLD PRESS JUICER

(71) Applicant: Several Gardens Farm, Seattle, WA (US)

(72) Inventors: David Feinberg, Seattle, WA (US); Rajiv Gupta, Cupertino, CA (US); Richard Ashley Shute, Kent (GB)

(73) Assignee: SEVERAL GARDENS FARM, Seattle, WA (US)

(*) Notice: Subject to any disclaimer, the term of this patent is extended or adjusted under 35 U.S.C. 154(b) by 364 days.

(21) Appl. No.: 14/659,215

(22) Filed: Mar. 16, 2015

(65) Prior Publication Data

US 2015/0257435 A1 Sep. 17, 2015

Related U.S. Application Data

(60) Provisional application No. 61/953,546, filed on Mar. 14, 2014.

(51) Int. Cl.
| | |
|---|---|
| *A23N 1/02* | (2006.01) |
| *A47J 19/00* | (2006.01) |
| *A47J 19/02* | (2006.01) |

(52) U.S. Cl.
CPC .............. *A23N 1/02* (2013.01); *A47J 19/00* (2013.01); *A47J 19/025* (2013.01)

(58) Field of Classification Search
CPC ............ A23N 1/02; A47J 19/025; A47J 19/00
USPC ........................................................ 100/213
See application file for complete search history.

(56) References Cited

U.S. PATENT DOCUMENTS

| | | | | |
|---|---|---|---|---|
| 2,119,972 | A | * 6/1938 | Steinbiss | A47J 19/025 100/110 |
| 2,864,419 | A | * 12/1958 | Woock | A47J 19/025 99/513 |
| 3,086,455 | A | * 4/1963 | Belk | A23N 1/003 100/131 |

(Continued)

FOREIGN PATENT DOCUMENTS

| | | |
|---|---|---|
| CN | 103405126 | 11/2013 |
| EP | 2522259 | 11/2012 |
| WO | 2013114243 | 8/2013 |

OTHER PUBLICATIONS

Norwalk. "Juicer." (circa 1945-1955).

(Continued)

*Primary Examiner* — Sean Michalski
(74) *Attorney, Agent, or Firm* — Kilpatrick Townsend & Stockton LLP

(57) ABSTRACT

Disclosed is a juicer device. In some aspects, the juicer includes a feed housing releasably connected about a rotatable cutter, and an input chute of the feed housing can be offset away from a side of the cutter that rotates upward. In some aspects, the juicer includes a feed housing releasably connectable by a rotation of the feed housing relative to the mount from an aligned position to an installed position so that the feed housing is locked in place in response to the rotating motion. In some aspects, the juicer includes a press chamber in which pulp can be squeezed for juice extraction. The press chamber can include a base and a wall, and a press chamber form can include a continuous piece of material forming at least a portion of the base, at least a portion of the wall, and a transition between the base and the wall.

20 Claims, 9 Drawing Sheets

(56) References Cited

U.S. PATENT DOCUMENTS

| | | | | |
|---|---|---|---|---|
| 3,976,001 | A * | 8/1976 | Trovinger | A23N 1/02 99/513 |
| 4,138,066 | A * | 2/1979 | Mullins | A47J 19/00 241/282.1 |
| 4,440,074 | A * | 4/1984 | Ihara | A47J 19/025 100/117 |
| RE31,631 | E * | 7/1984 | McFarland | A22C 17/04 100/117 |
| 4,872,404 | A * | 10/1989 | Quetsch | B30B 9/22 100/110 |
| 4,884,755 | A * | 12/1989 | Hedrington | A47J 43/255 241/169.1 |
| 5,396,836 | A * | 3/1995 | Kim | A47J 19/06 241/101.2 |
| 5,761,993 | A * | 6/1998 | Ling | A47J 19/027 241/261 |
| 5,806,413 | A * | 9/1998 | Trovinger | A47J 19/02 241/37.5 |
| 6,234,071 | B1 * | 5/2001 | Catarain Arregui | A23N 1/003 99/501 |
| 6,321,644 | B1 * | 11/2001 | Kao | A47J 19/025 100/125 |
| 6,425,321 | B1 * | 7/2002 | Yip | A47J 19/025 99/495 |
| 6,637,323 | B2 * | 10/2003 | Kim | A47J 19/025 100/117 |
| 6,655,615 | B1 * | 12/2003 | Hartmann | A23N 1/02 241/71 |
| 6,722,268 | B2 * | 4/2004 | Catelli | A23N 1/02 241/101.01 |
| 6,832,543 | B2 * | 12/2004 | Siano | A47J 43/06 241/101.01 |
| 6,854,382 | B2 * | 2/2005 | Jan | A23N 1/00 100/117 |
| 7,044,051 | B2 * | 5/2006 | Le Rouzic | A47J 43/0716 99/511 |
| 7,267,050 | B2 * | 9/2007 | Durris | A47J 19/027 100/213 |
| 7,533,838 | B2 * | 5/2009 | Kalogroulis | A47J 42/46 241/169.1 |
| 8,181,894 | B2 * | 5/2012 | Majer | A47J 42/18 241/100 |
| 8,474,374 | B2 * | 7/2013 | Trovinger | A23N 1/02 100/145 |
| 8,640,610 | B2 * | 2/2014 | Wang | A47J 19/025 99/502 |
| 9,113,740 | B2 * | 8/2015 | Wong | A47J 19/025 |
| 9,198,540 | B2 * | 12/2015 | Carlson | A47J 43/0716 |
| 9,241,598 | B2 * | 1/2016 | Rouyer | A47J 43/255 |
| 9,556,916 | B2 * | 1/2017 | Conti | F16D 7/02 |

OTHER PUBLICATIONS

Green Power Gold Juice Extractor (Model E-1503) Now called the Green Star Gold Juice Extractor [online]. Discount Juicers.com, 1998 [retrieved on Jul. 15, 2014]. Retrieved from the Internet: <URL: http://www.discountjuicers.com/greenpower.html>.

Kohler, John. The Best Juicer, Is there one? [online]. Discount Juicers.com, 1999 [retrieved on Jul. 15, 2014]. Retrieved from the Internet: <URL: http://www.discountjuicers.com/bestjuicer.html>.

The Omega 4000 Juicer with 15 Year Warranty [online]. Discount Juicers.com, 2000 [retrieved on Jul. 15, 2014]. Retrieved from the Internet: <URL: http://www.discountjuicers.com/omega4000.html>.

Norwalk. The Ultimate Juicer: Model 280 Instruction Book (Sep. 2012), 66 pages.

PCT/US2015/020804 , "International Search Report and Written Opinion", mailed Aug. 28, 2015, 15 pages.

PCT/US2015/020804 , "Invitation to Pay Add'l Fees and Partial Search Report", mailed Jun. 23, 2015, 4 pages.

* cited by examiner

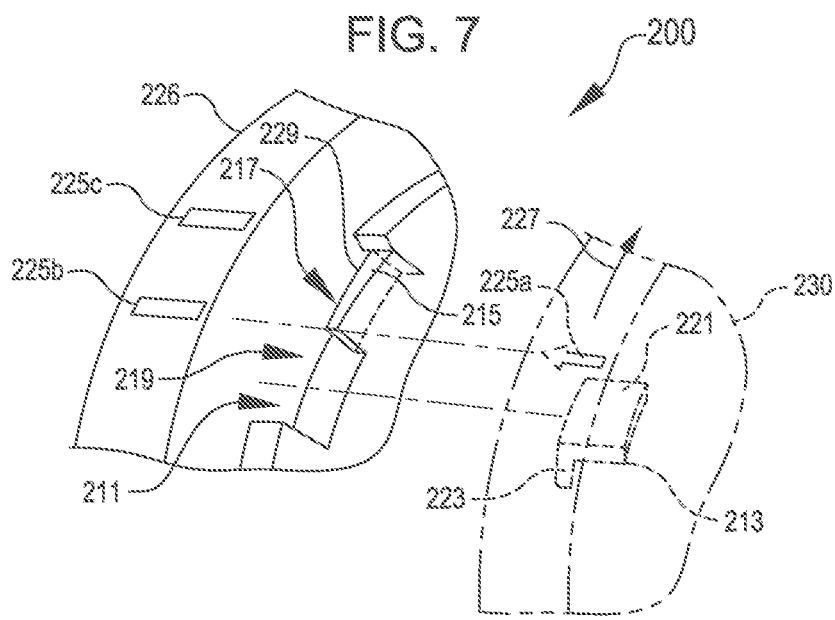
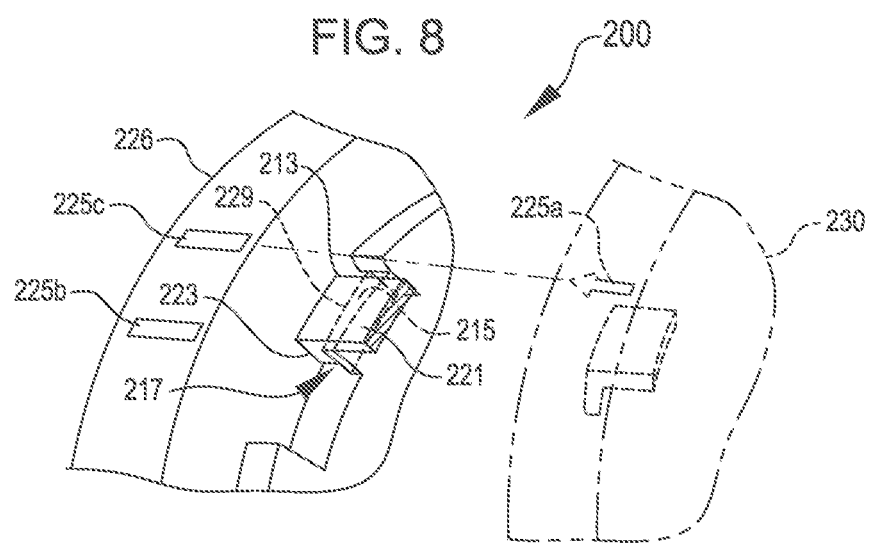

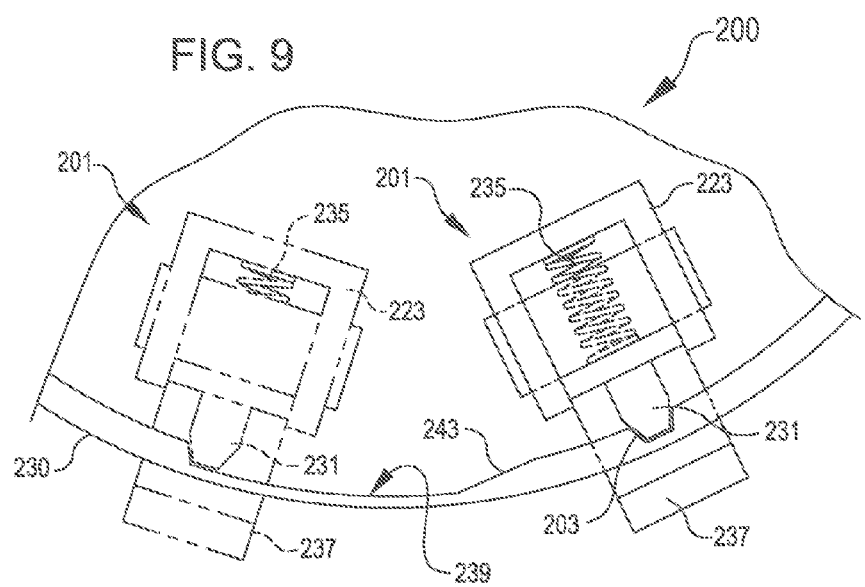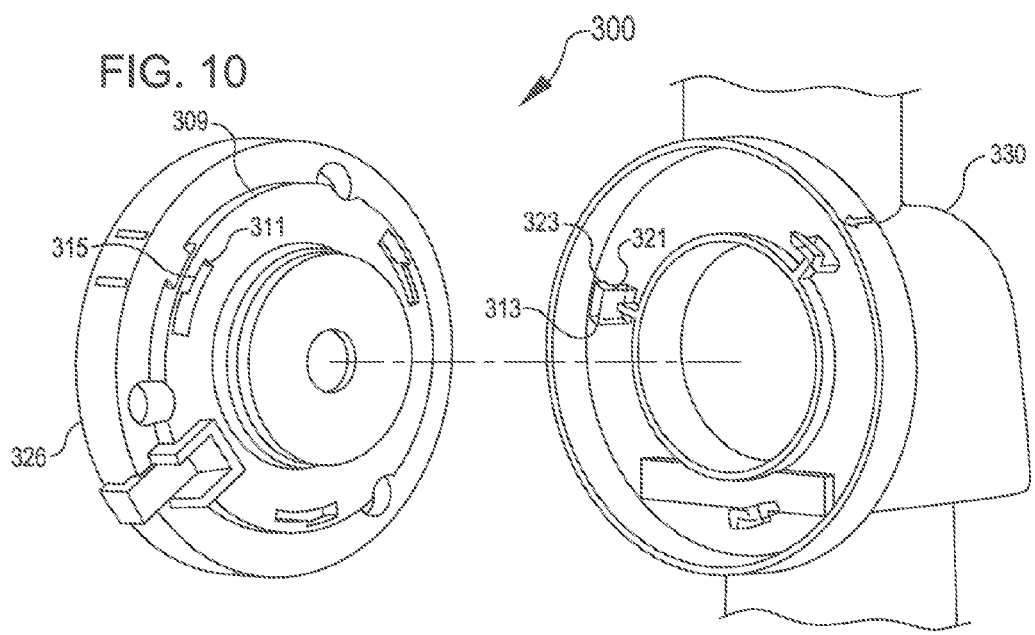

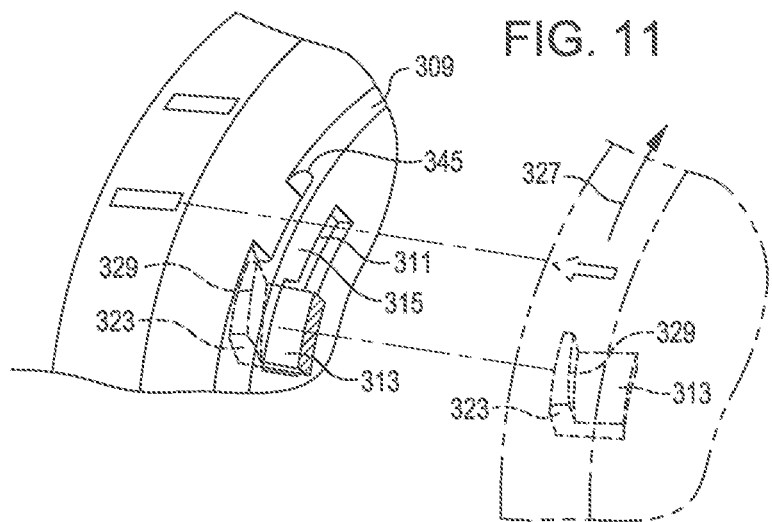
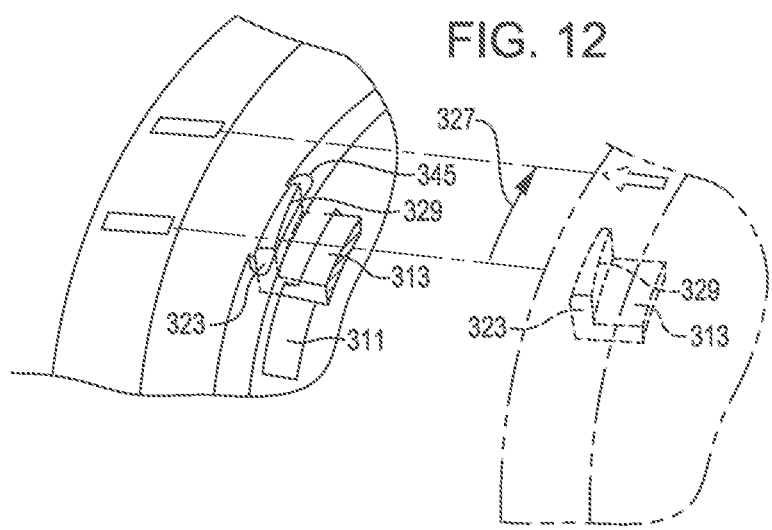

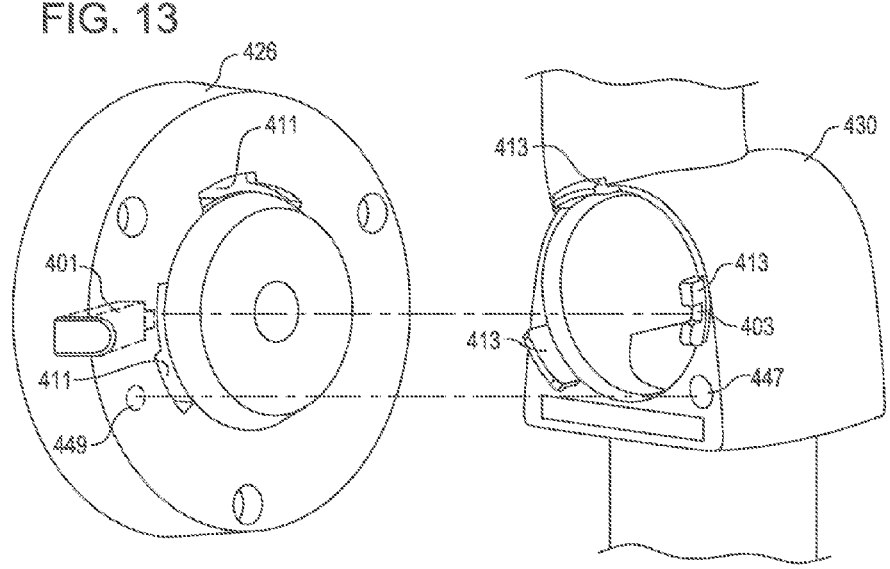
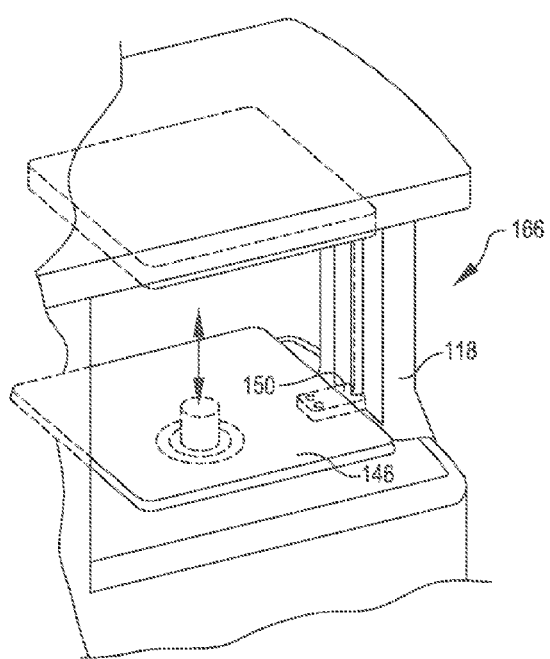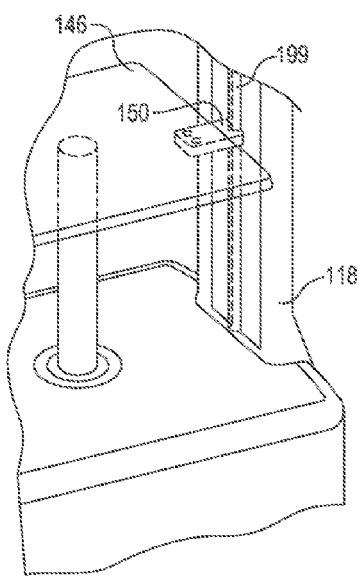

TWO STAGE COLD PRESS JUICER

CROSS-REFERENCES TO RELATED APPLICATIONS

The present application claims the benefit of U.S. Provisional Application No. 61/953,546, filed on Mar. 14, 2014, the full disclosure of which is incorporated herein by reference.

TECHNICAL FIELD

The present disclosure relates generally to juicing devices and, more particularly (although not necessarily exclusively), to two-stage cold press juicers.

BACKGROUND OF THE INVENTION

Juice is a liquid found in fruits and vegetables. Juice can provide a significant source of nutrients and often has a rich, potent flavor. Fruits and vegetables are often processed to extract juice in order to obtain a concentrated form of nutrients and/or flavor from the fruits and vegetables. Many techniques for juicing have been developed. Juicing techniques are often evaluated by criteria such as yield, cleanliness, and alteration. For example, if selecting between different juicing techniques, most people will prefer the juicing technique that produces higher yields of juice from a starting amount of raw materials, the juicing technique that involves less and/or easier cleaning at the end of the process, and/or the juicing technique that results in fewer changes to attributes of the juice (such as the oxygenation level and/or temperature level) from the state in which the juice naturally occurs in the fruits or vegetables.

BRIEF SUMMARY

Certain aspects and examples of the present disclosure are directed to a two stage cold press juicer. The juicer can include components for a two-stage process of extracting juice from comestibles such as fruits or vegetables. In the first stage (sometimes called trituration), the juicer can grind the comestibles into a pulp. In the second stage, the pulp can be subjected to pressure, such as by being pressed between two surfaces. The pressure applied to the pulp can squeeze the juice from the pulp so that the juice can flow into a collection vessel.

In some aspects, the juicer can include a grinding subsystem that includes a feed housing and a cutter. The feed housing can be positioned around the cutter to form a grinding chamber. An input chute of the feed housing feeds into the grinding chamber and an output chute feeds out of the grinding chamber. The cutter can rotate so that cutting teeth will encounter comestibles inserted through the input chute and grind the comestibles into a pulp that can be ejected through the output chute. The input chute can be offset from a position directly over the cutter and/or grind chamber. For example, the input chute may be offset laterally away from a side of the cutter that is spinning upwards, which may reduce a risk of ground comestibles being ejected upward through the input chute.

The feed housing may be releasably connected with the juicer, for example, to facilitate cleaning and/or maintenance of the feed housing, the cutter, or other components of the juicer. In some aspects, the juicer includes a mounting system to facilitate releasably connecting the feed housing with the juicer. For example, the mounting system may include bayonet-style mounting features or other locking features on the feed housing and/or a mounting plate on the juicer. In some aspects, the mounting system permits the feed housing to be moved by a single twisting or rotating motion from a position in which the feed housing is aligned with the juicer for installation to a fully installed, locked, and/or secured position. The mounting system may additionally or alternatively include a spring loaded detent or other retention feature to secure the feed housing in an installed position.

In some aspects, the juicer can include a pressing subsystem that includes a press chamber. The press chamber can include a tray that can receive pulp from comestibles ground by the grinding subsystem. The tray may be positioned beneath a press plate in the press chamber. The tray can be pushed against the press plate, such as by a hydraulic press. The tray may be prevented from rotating by an arm extending from the tray into a groove in a vertical upright along a side of the press chamber. Such an arrangement may prevent rotation of the tray in a manner that reduces or eliminates any number of other openings for receiving rotation-preventing features, such as other openings (e.g., through a bottom of the press chamber) that may otherwise permit passage of comestibles into an interior of the juicer. In some aspects, the juicer includes a press chamber form that includes a single continuous piece of material forming a bottom, a side, and a top of the press chamber. Forming a continuous, gapless joint between adjacent surfaces of the press chamber by such a continuous press chamber form can reduce a number of joints through which juice might otherwise seep to cause cleaning difficulties and/or other sanitation concerns.

BRIEF DESCRIPTION OF THE DRAWINGS

Various embodiments in accordance with the present disclosure will be described with reference to the drawings, in which:

FIG. 7 is a partial view illustrating a cleat and a lip of the mounting system of FIG. 6 being aligned for mounting according to certain aspects.

FIG. 8 illustrates engagement of the cleat and the lip of FIG. 7 according to certain aspects.

FIG. 9 illustrates a retention mechanism of the mounting system of FIG. 6 according to certain aspects.

FIG. 10 is an exploded assembly view illustrating a mounting plate and a feed housing of another example of a mounting system for a juicer such as the juicer of FIG. 1 according to certain aspects.

FIG. 11 is a partial view illustrating a cleat and a lip of the mounting system of FIG. 10 being aligned for mounting according to certain aspects.

FIG. 12 illustrates engagement of the cleat and the lip of FIGS. 10-11 according to certain aspects.

FIG. 13 is an exploded assembly view illustrating a mounting plate and a feed housing of a further example of a mounting system for a juicer such as the juicer of FIG. 1 according to certain aspects.

FIG. 14 is a perspective view of a press chamber according to certain aspects.

FIG. 15 is a partial view of one side of the press chamber of FIG. 14, illustrating a guide arm relative to a vertical support according to certain aspects.

DETAILED DESCRIPTION OF THE INVENTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Figure 1:
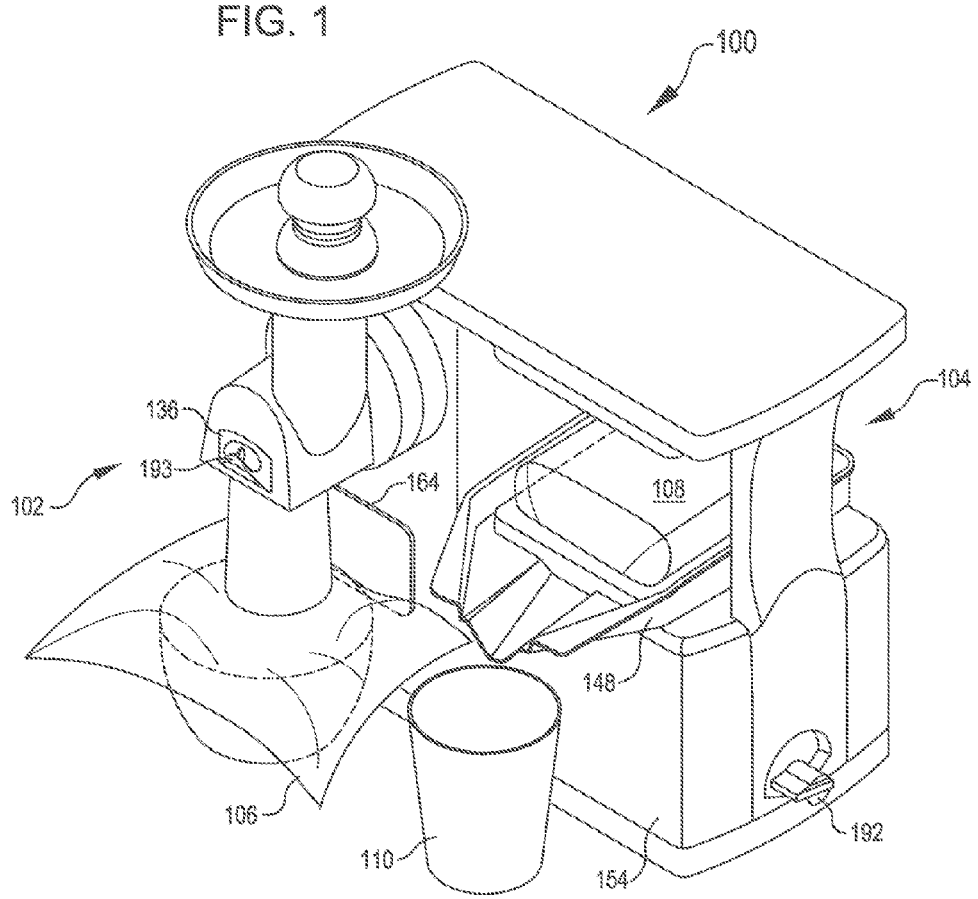
FIG. 1 is a perspective view illustrating a two-stage cold press juicer according to certain aspects.

Referring now to the drawings, in which elements identified by like name and reference number may refer to like elements throughout the several views, FIG. 1 illustrates an example of a two-stage cold press juicer 100 according to certain aspects. The juicer 100 can include a grinding subsystem 102 and a pressing subsystem 104. Comestibles can be passed through the grinding subsystem 102 and converted into pulp. Pulp produced by the grinding subsystem 102 can be collected in a cloth 106. Although the cloth 106 is shown in FIG. 1 as a sheet, in some aspects the cloth 106 is formed as a bag for receiving the pulp. The cloth 106 can be folded about the pulp and formed into a packet 108. The pressing subsystem 104 can press or squeeze the packet 108. This pressure can cause juice to flow out of the pulp, through the cloth 106 of the packet 108, and into a vessel 110. The grinding subsystem 102 and the pressing subsystem 104 can include a variety of components to facilitate these functions, which can include components of the juicer 100 that will now be identified with respect to FIG. 2.

Figure 2:
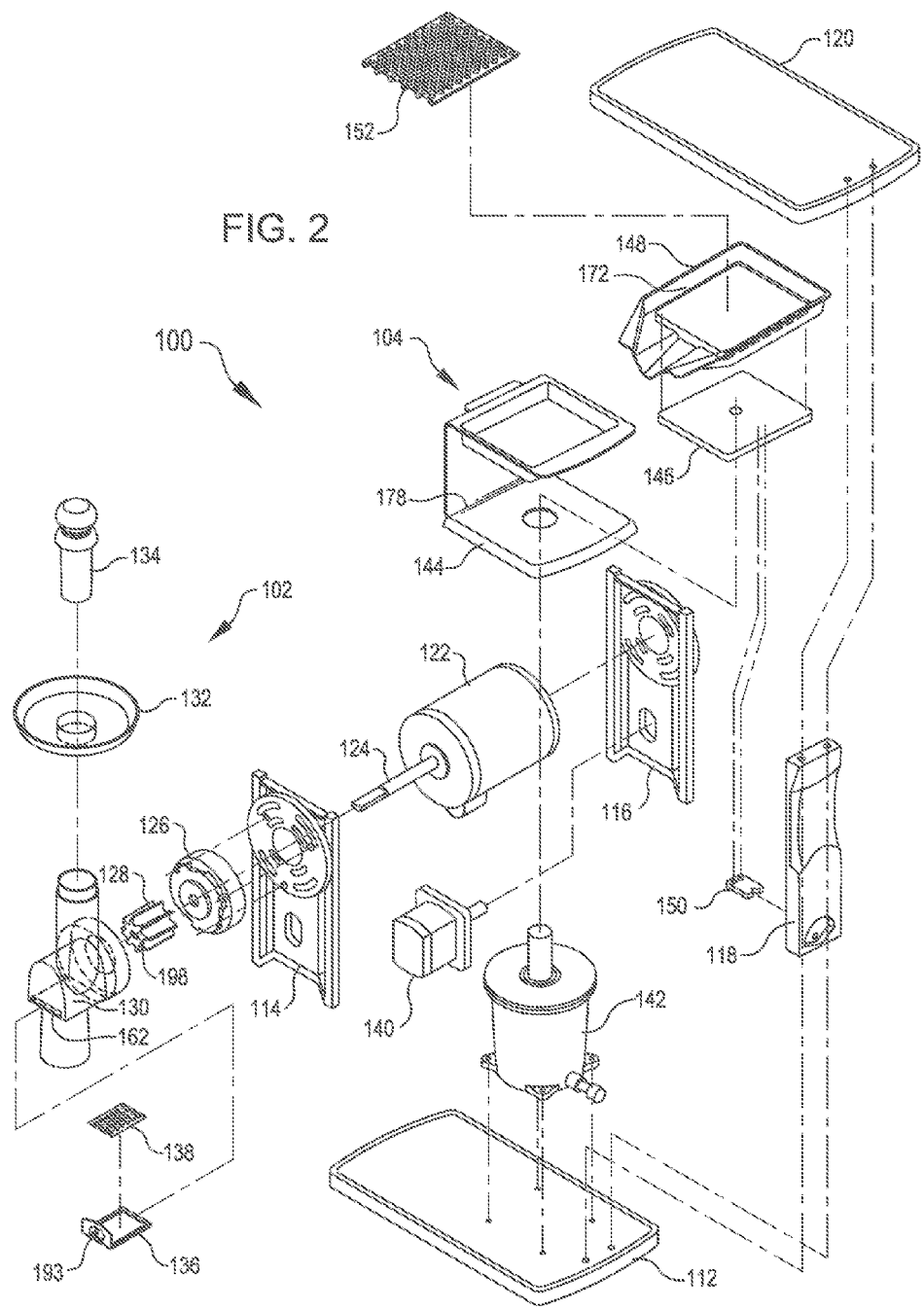
FIG. 2 is an exploded assembly view illustrating some components of the juicer of FIG. 1, according to certain aspects.

FIG. 2 is an exploded assembly view of the juicer 100, illustrating various components of the juicer 100 according to certain aspects. The juicer 100 can have a frame that includes a base plate 112, a first vertical support 114, a second vertical support 116, a third vertical support 118, and a top plate 120. The grinding subsystem 102 of the juicer 100 can include a motor 122, a shaft 124, a mount plate 126, a cutter 128, and a feed housing 130. The feed housing 130 may be releasably connected with the mount plate 126. Additional components may be utilized with the feed housing 130, including, but not limited to, a feed pan 132, a pusher 134, a grid tray 136, and a grid 138. The pressing subsystem 104 can include the motor 122, a pump 140, a hydraulic (or other form of) press 142, a press chamber form 144, a platen 146, a juice tray 148, a guide arm 150, and a juice pallet 152. Although omitted from FIG. 2 so to not obscure other components, the juicer 100 can also include an exterior housing 154. For example, as shown in FIG. 1, the exterior housing 154 may include panels or plates attached to the frame so as to define an interior volume of the juicer 100. The interior volume may house internal components that may be shielded from view and/or exposure to an exterior of the juicer 100 by the exterior housing 154. The exterior housing 154 can be made of metal or any other suitable material.

The motor 122 can be supported by the first vertical support 114 and the second vertical support 116. The motor 122 can rotate the shaft 124. The shaft 124 can extend through and/or past the first vertical support 114 to an exterior position external to the exterior housing 154. For example, the shaft 124 may extend to and/or through the mount plate 126. The mount plate 126 may be positioned external to the exterior housing 154. In some aspects, the mount plate 126 includes an internal bearing for receiving the shaft 124. Such an arrangement can provide convenient access to the bearing for replacement without requiring that the motor 122 be removed from the juicer 100 in the process. The mount plate 126 can additionally or alternatively include one or more seals (such as O-rings or other seals against passage of liquid). The one or more seals may reduce a risk of passage of oil and/or other lubricant from the motor 122 toward an exterior of the mount plate 126 and/or passage of liquid such as fruit and/or vegetable juice from an exterior of the mount plate 126 along the shaft 124 toward the motor 122.

The cutter 128 can be coupled to the shaft 124 such that rotation of the motor 122 will cause rotation of the cutter 128. The cutter 128 may be releasably connected to the shaft 124, which may facilitate removal of the cutter 128 for maintenance and/or cleaning. In some aspects, the cutter 128 is held in place on the shaft 124 by the feed housing 130 when the feed housing 130 is coupled with the mount plate 126. The cutter 128 may include a shaped channel 198 matching the shape of a key at the end of the shaft 124. As may be best seen in FIG. 3, the channel 198 may extend through a full length of the cutter 128, which may facilitate ease of cleaning the cutter 128 (e.g., by passage of water or other cleaning liquids through the cutter 128). The cutter 128 may also include a set screw 197 having a spring-biased ball to further secure the cutter 128 to the shaft 124 (FIG. 1). In some aspects the cutter 128 has blades that sweep along an axial length of the cutter 128 at an angle to the axis of rotation. The sweep of the blades of the cutter 128 can provide a biasing moment for retaining the cutter 128 on the shaft 124 during rotation. Although the cutter 128 is illustrated with eight radially extending blades in FIG. 2 and other figures herein, any number of teeth or blades may be utilized including, eight, more than eight, or less than eight.

In some aspects, the pump 140 can be driven by the motor 122. For example, the pump 140 may have a shaft coupled by a belt or other suitable mechanism to the shaft 124 of the motor 122, such as on an end of the shaft 124 opposite an end engaging the cutter 128. The pump 140 can provide pressure for operating the hydraulic press 142. The hydraulic press 142 can be coupled with the platen 146 so that the platen 146 is movable in response to actuation of the hydraulic press 142. The juice tray 148 may be shaped to engage the platen 146 so that the juice tray 148 moves in response to movement of the platen 146. Although the juice tray 148 is shown in FIG. 2 as a distinct and readily separable component from the platen 146, in some aspects, the platen 146 and the juice tray 148 may be a single integrated component. One advantage of a juice tray 148 that is separable from the platen 146 is that the juice tray 148 may be more easily removed from the juicer 100 for cleaning and/or maintenance purposes. In some aspects, the platen 146 and/or the juice tray 148 is rectangular instead of square, which can increase a surface area for application of force for squeezing.

Figure 3:
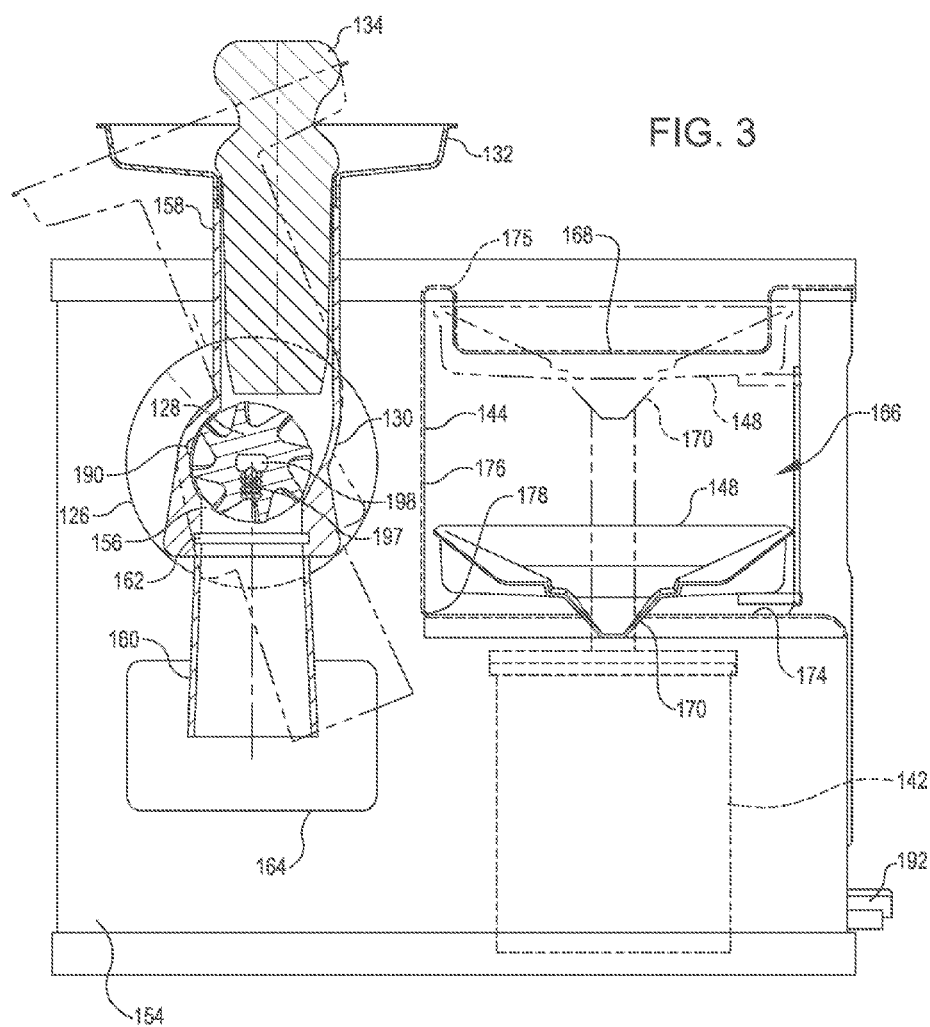
FIG. 3 is a front view of the juicer of FIGS. 1 and 2, with a feed housing shown in a cutaway view so as to better illustrate operation of the juicer according to certain aspects.

FIG. 3 is a front view of the juicer 100, with the feed housing 130 shown in a cutaway view so as to better illustrate operation of the juicer 100 according to certain aspects. The feed housing 130 can be attached to the juicer 100, for example via the mount plate 126. In some aspects, the feed housing 130 can be rotated or twisted in order to install the feed housing 130 with respect to the juicer 100. For example, the feed housing 130 may be installed by rotating the feed housing 130 from the position shown in phantom line in FIG. 3 to the position shown in solid line in FIG. 3. In various aspects, the feed housing 130 may be locked into place in a fully installed position in response to the rotating installing motion. Various examples of mounting systems that may facilitate such a twisting installation are described herein with respect to FIGS. 5-13.

When installed, the feed housing 130 can provide a grind chamber 156 about the cutter 128. For example, the feed housing 130 may include an opening on a rear side into which the cutter 128 fits when the feed housing 130 is installed. The grind chamber 156 may be defined between an inside of the feed housing 130 and the surface of the mount plate 126 to which the feed housing 130 attaches.

The feed housing 130 can include an input chute 158 and an output chute 160, each in fluid communication with the grind chamber 156. The feed pan 132 can be coupled with the input chute 158. In operation, comestibles can be placed in the feed pan 132 and/or into the input chute 158 and driven through the input chute 158 into the grind chamber 156 by the pusher 134. The cutter 128 can be rotated (such as by the motor 122 via the shaft 124) so the teeth on the cutter 128 engage the comestibles introduced into the grind chamber 156. In some aspects, the rotating teeth on the cutter 128 can pull the comestibles into the grind chamber 156 without intervention of the pusher 134. The cutter 128 can cut or grind the comestibles into smaller pieces to produce a pulp from the comestibles.

The feed housing 130 can include a slot 162. The slot 162 can receive a grid tray 136 carrying a grid 138 (best seen in FIG. 2). The grid 138 can include a set of perforations or openings sized so as to permit passage of comestible particles of a certain size. As may be best seen with reference to FIG. 3, the slot 162 may be positioned so that the grid 138 supported by the grid tray 136 in the slot 162 can provide a boundary of the grind chamber 156, for example, along a bottom side of the grind chamber 156. Hence, the grid 138 can provide a mechanism by which comestible pulp will remain or be retained in the grind chamber 156 until the cutter 128 has acted on the pulp a sufficient amount to produce a pulp of a consistency fine enough to pass through the openings in the grid 138. In some aspects, the inside of the grind chamber 156 includes one or more stationary blades (such as sharp edges formed by a bore 190 or other gouge in the surface of the grind chamber 156), which can supplement the amount of cutting or grinding occurring in the grind chamber 156.

The pulp produced by the cutter 128 in the grind chamber 156 can be ejected through the output chute 160. In some aspects, the output chute 160 is flared, having a larger outer diameter at an end away from the grind chamber than an end proximate the grind chamber. Such a tapered output chute 160 may reduce a risk of pulp becoming lodged in the output chute 160 and increase a likelihood that the pulp will fall under the effect of gravity instead of sticking to the inside of the output chute 160.

The pulp discharged from the output chute 160 can be collected in a cloth 106 (e.g., FIG. 1). In some aspects, a bumper 164 is provided on the exterior housing 154 of the juicer 100. The bumper 164 can reduce a risk of the exterior housing 154 becoming scratched or worn by contact with a bowl or other receptacles for holding a cloth 106 beneath the output chute 160. The bumper 164 may be any suitable material, including, but not limited to rubber or plastic. In some aspects, the bumper 164 may be positioned in an indentation embossed in the exterior housing 154 so that the bumper 164 is substantially flush with the exterior housing 154. In some aspects, a hook 193 (e.g., FIG. 1), knob, handle, or other appropriate feature can be provided on the grid tray 136 or at another suitable position along a front of the feed housing 130 for securing a bag of cloth 106 around the output chute 160. For example, the hook 193 may be positioned near an opening so that a drawstring or other cord from a bag of cloth 106 can be routed through the opening and over the hook 193. In some aspects, a thermometer may be included for indicating a temperature in the grind chamber 156. For example, a thermometer may allow a user to monitor temperature to determine if conditions in the grind chamber 156 are affecting a quality of the pulp being collected in the cloth 106. Although not shown in the drawings, the thermometer may include a display in any suitable location, including, but not limited to, the feed housing 130, the exterior housing 154, the mount plate 126, or the grid tray 136.

As best seen in FIG. 1, the cloth 106 can be folded around the pulp generated by the grinding subsystem 102 in order to form a packet 108 that can be placed in the juice tray 148. As best seen in FIG. 3, the juice tray 148 can be moved within a press chamber 166 (e.g., by operation of the hydraulic press 142, such as by turning a control lever 192). The press chamber 166 can include a press plate 168. As the juice tray 148 is moved toward the press plate 168 (e.g., from the position of the juice tray 148 illustrated in solid lines in FIG. 3 to the position of the juice tray 148 illustrated in phantom lines in FIG. 3), the juice packet 108 can be sandwiched between the juice tray 148 and the press plate 168. Continued pressure from the hydraulic press 142 pushing the juice tray 148 and the press plate 168 toward one another can compress the juice packet 108 and cause juice to be squeezed out of the pulp. The juice can flow through the cloth 106 forming the boundaries of the packet 108 while the pulp is retained inside the packet 108 and further compressed to release more juice. The juice flowing through the cloth 106 can flow out of the spout 170 (or other appropriate routing structure) of the press plate 168 and into the collection vessel 110 (FIG. 1). In some aspects, a bumper similar to the bumper 164 can be positioned on the exterior housing 154 beneath the juice tray 148, e.g., to reduce wear from contact with collection vessels 110. In some aspects, the spout 170 is replaced and/or supplemented by hosing between the juice tray 148 and the collection vessel 110. For example, hosing may reduce an amount of time that the juice is exposed to oxygen and/or facilitate application of a vacuum to the vessel 110, such as for preserving the juice in a fresh-squeezed state. In some aspects, the juicer 100 may include a vacuum pump and/or other components to facilitate such an arrangement.

In some aspects, juice may be extracted from the packet 108 at a rate greater than the juice can flow out of the spout 170. This may cause juice to overflow one or more sides of the juice tray 148. As best seen in FIG. 2, the juice tray 148 may include channels 172 (such as around a perimeter of the juice tray 148), which can provide additional volume in which juice can collect for flowing out of the juice tray 148 as intended instead of overflowing over the sides. In some aspects, the juice pallet 152 can additionally or alternatively be used to reduce a risk of overflow of the juice tray 148. The juice pallet 152 can include a series of raised portions, channels, and/or openings, thereby providing additional volume beneath the packet 108 into which juice can flow when the packet 108 is being compressed.

In some aspects (and as best seen with reference to FIGS. 2 and 3), the press chamber 166 is defined at least in part by the press chamber form 144. The press chamber 166 can include a first surface and a second surface on opposite sides of the press chamber 166 and joined by a third surface extending between the two surfaces. For example, the press chamber 166 is illustrated in FIGS. 2 and 3 with a bottom 174, a top 175, and a sidewall 176 extending between the bottom 174 and the top 175. Although described as a bottom 174 and a top 175, embodiments are not limited to arrangements in which the bottom 174 and the top 175 are arranged so that the top 175 is positioned above the bottom 174 when the juicer 100 is in operation. The press chamber form 144 can be a single, continuous piece of material defining adjacent portions of the press chamber 166 and the transitions between the adjacent portions. For example, the press chamber form 144 can include the bottom 174, the sidewall 176, and a transition or seam 178 between the bottom 174 and the sidewall 176. The seam 178 may be smooth and unbroken, formed without gaps into which stray juice might otherwise seep and cause sanitation concerns. The seam 178 may be curved to facilitate ease of cleaning of the press chamber 166, such as for wiping up of any juice that spills or splatters over the sides of the juice tray 148. In some aspects, the press chamber form 144 further includes the top 175 and/or the press plate 168, along with additional gapless transitions.

Figure 4:
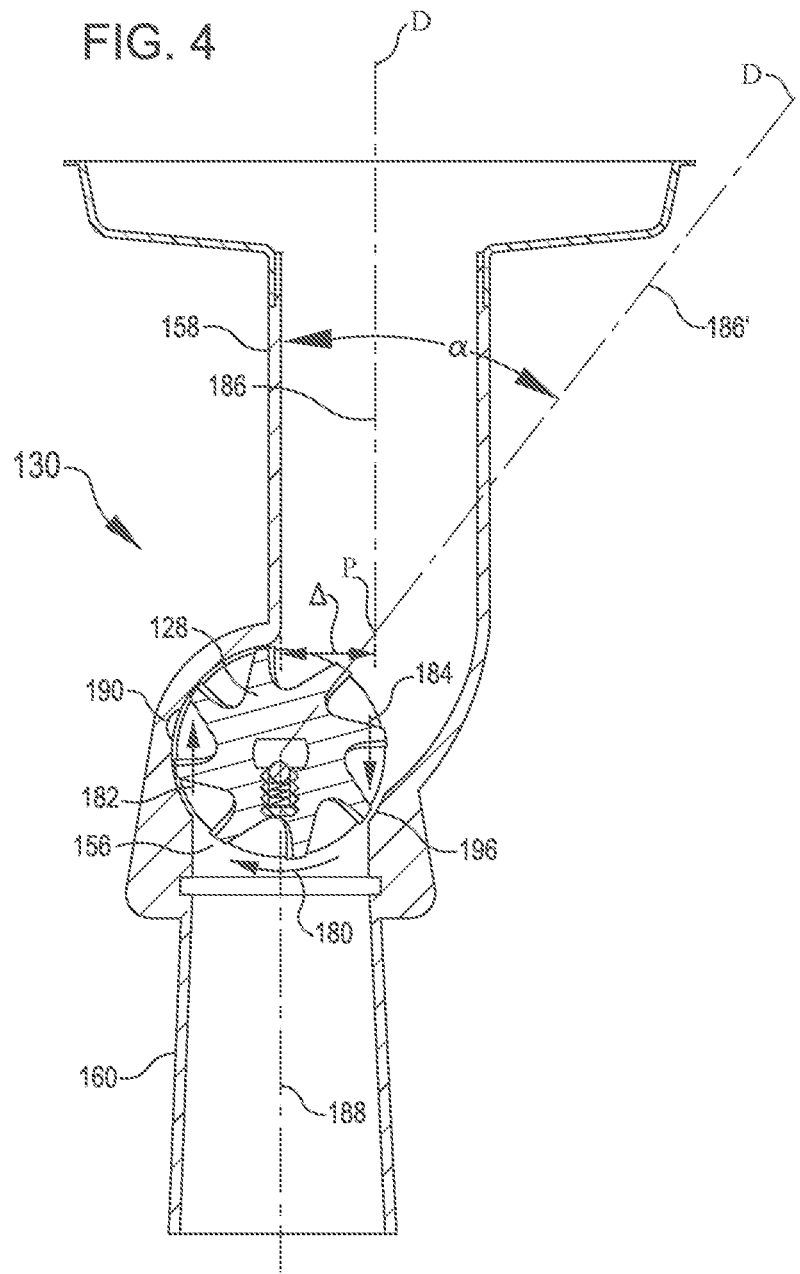
FIG. 4 is a section view of the feed housing of the juicer of FIGS. 1-3 according to certain aspects.

FIG. 4 is a section view of the feed housing 130 of the juicer 100 according to certain aspects. In some aspects, the feed housing 130 has an offset input chute 158. For example, the input chute 158 may be offset from a position directly over the grind chamber 156 (e.g., offset from a position directly over the cutter 128 when the feed housing 130 is installed). The amount that the input chute 158 is offset can be quantified with respect to a grind chamber axis 188 and an input chute axis 186, which may each be vertical axes.

The grind chamber axis 188 can be defined through the grind chamber 156. When the feed housing 130 is installed, the grind chamber axis 188 can pass through a center of the cutter 128 and/or intersect an axis of rotation of the cutter 128. The axis of rotation of the cutter 128 can be horizontal. The cutter 128 can be rotated about the axis of rotation in a first direction (e.g., illustrated by the arrow 180 in FIG. 4) in response to rotation of the motor 122. Rotation of the cutter 128 can cause one side of the cutter 128 to move in an upward direction (e.g., illustrated by arrow 182 on a left lateral side of the grind chamber axis 188 in FIG. 4) and an opposite side of the cutter 128 to move in a downward direction (e.g., illustrated by arrow 184 on a right lateral side of the grind chamber axis 188 in FIG. 4).

The input chute axis 186 can be defined generally aligned along a center of the input chute 158 of the feed housing 130. The input chute axis 186 can have a proximal end P proximal to the grind chamber 156 and a distal end D distal to the grind chamber 156. The proximal end P of the input chute axis 186 can be offset from the grind chamber axis 188 by an amount Δ. The amount Δ can correspond to an amount that the input chute 158 is offset away from the side of the cutter 128 that is rotating upward. For example, as shown in FIG. 4, the input chute axis 186 is offset to the right (e.g., away from the upward arrow 182) by the amount Δ from the grind chamber axis 188. Such an offset can reduce a risk that pulp generated by the cutter 128 will be propelled upward out of the input chute 158 during operation of the juicer 100.

In some aspects, the input chute 158 is offset by an amount within a particular spectrum. For example, in one spectrum, a first end of the spectrum (e.g., 0%) may correspond to an amount Δ of zero (e.g., in which the input chute 158 would be positioned directly above the grind chamber 156), an opposite end of the spectrum (e.g., 100%) may correspond to an amount Δ in which an edge of the input chute 158 that is closest to the side of the cutter 128 that is moving upward is aligned with the grind chamber axis 188 (e.g., in the position shown in FIG. 4), and the offset is a certain amount within that spectrum. In one example embodiment, a suitable offset range is between 30% and 135% of this example spectrum, and in another example embodiment, the offset range is between 60% and 100% of this example spectrum. Such offset ranges may provide a balance between reducing a risk that pulp will be ejected upward out of the input chute 158 along a tangency of the cutter 128 on the one hand and on the other hand facilitating introduction of comestibles to the cutter 128 at an angle suited for the cutter 128 to engage and grind the comestibles. As further illustrative examples, the feed housing 130 shown in FIG. 4 is shown at a position substantially corresponding to 100% of the example spectrum, and the feed housing 130 shown in FIG. 3 is shown at a position substantially corresponding to 67% of the example spectrum.

In some aspects, the input chute 158 additionally or alternatively may be angled relative to the grind chamber axis 188. For example, the input chute 158 may be aligned along an angled component 186' so that the distal end D of the input chute 158 is angled away from the grind chamber axis 188 by an angle α. Although the input chute 158 is illustrated as substantially not angled (e.g., at an angle α of 0°), in some embodiments, the input chute 158 may be angled at an angle α of a small angle such as 5°, or any other angle larger or smaller than 5°. An input chute 158 angled at a positive angle α (e.g., tilted toward the right side of FIG. 4) can be easier to access by a right hand of a user, while an input chute 158 angled at a negative angle α (e.g., tilted toward the left side of FIG. 4) can be easier to access by a left hand of a user. In some aspects, the grind chamber axis 188 is aligned so as to pass through a center of the output chute 160. In such cases, the amount Δ of the offset may be quantified as an amount of offset between the central axes of the input chute 158 and the output chute 160.

In some aspects, the feed housing 130 can include a separator section 196 positioned between the ends of the input chute 158 and the output chute 160. The separator section 196 can provide a section of separation between the geometry of the input chute 158 and the output chute 160. For example, in the absence of a separator section 196, comestibles input into the input chute 158 may slip partially past the cutter 128 into the geometry of the output chute 160 and jam the cutter 128. The separator section 196 may be contoured to match a shape of the cutter to increase a likelihood that any comestibles will be engaged with the cutter 128 for grinding before moving from the geometry of the input chute 158 and the output chute 160.

Figure 5:
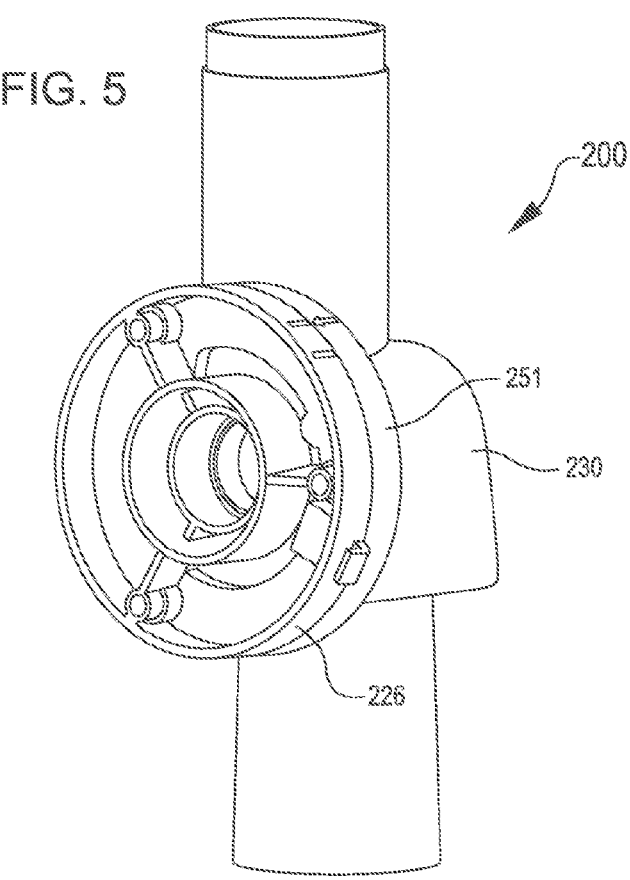
FIG. 5 is a rear perspective view of a mounting plate and a feed housing of an example of a mounting system for a juicer such as the juicer of FIG. 1 according to certain aspects.

Various mounting systems may be utilized to secure the feed housing 130 to the juicer 100. For example, FIG. 5 is a rear perspective view of a mount plate 226 and a feed housing 230 of an example of a mounting system 200 according to certain aspects. The feed housing 230 is shown releasably connected to the mount plate 226 and locked in place.

Figure 6:
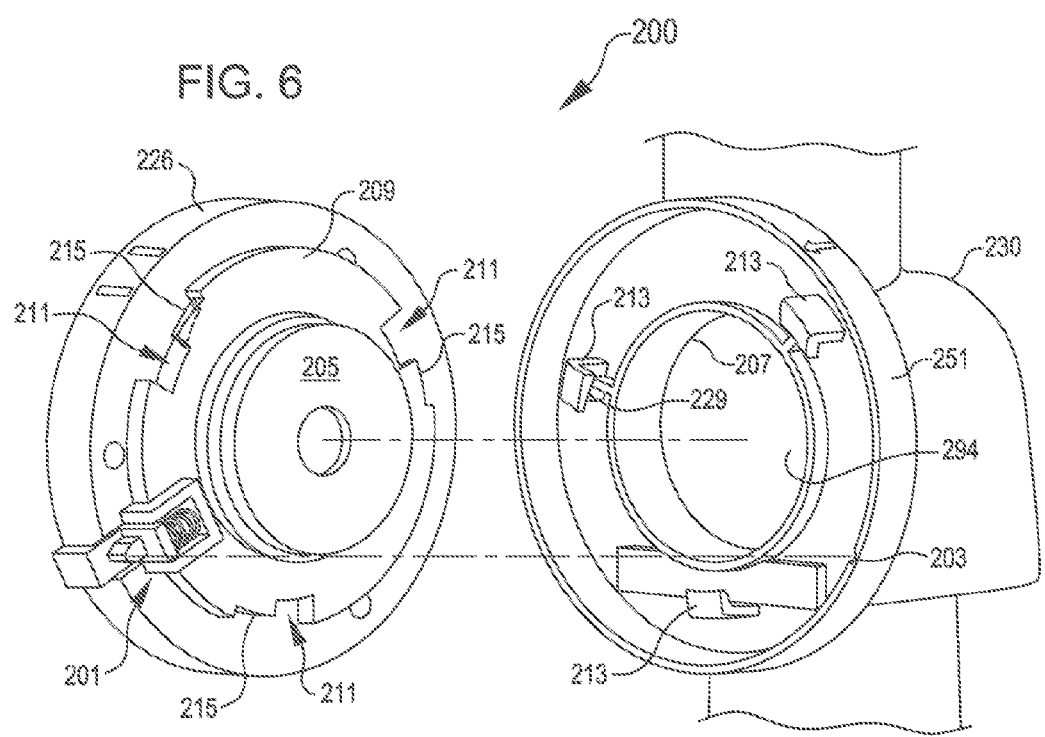
FIG. 6 is an exploded assembly view illustrating corresponding features of the mounting plate and the feed housing of the mounting system of FIG. 5 according to certain aspects.

FIG. 6 is an exploded assembly view illustrating corresponding features of the mount plate 226 and the feed housing 230 of the mounting system 200 according to certain aspects. The mount plate 226 can include features for receiving the feed housing 230. For example, the mount plate 226 can include a central boss 205 sized to receive a ring 207 of the feed housing 230. The ring 207 can define an outer edge of an opening 294 on a rear side of the feed housing 230. For example, the opening 294 may permit a cutter (e.g., the cutter 128 shown in FIG. 2) to be received and positioned within the feed housing 230 when the feed housing 230 is installed. In some aspects, the boss 205 can have a tapered radial edge, which may facilitate alignment of the feed housing 230 with respect to the mount plate 226. In some aspects, the taper of the boss 205 can produce an interference fit between the boss 205 and the ring 207 (e.g., for sealing a rear side of the grind chamber 156 about the cutter 128 of FIG. 3). In some aspects, a radial edge of the boss 205 includes an indentation 253 for receiving an O-ring or other suitable seal to provide an additional amount of sealing between the boss 205 and the ring 207.

The mount plate 226 can include locking structures for locking the feed housing 230 into an installed position. For example, the mount plate 226 can include lips 215 for locking engagement with corresponding cleats 213 of the feed housing 230. The lips 215 can be formed in a disk 209 extending away from a rear of the mount plate 226. The disk 209 can include slots 211 associated with the lips 215. The slots 211 can be arranged to facilitate moving the cleats 213 by a rotating motion into locking engagement with the lips 215. The slots 211 can be open in the radially outward direction of the disk 209 so as to facilitate water flow or other access for cleaning. The mount plate 226 can also include a retention mechanism 201 that can engage a feature such as a notch 203 on the feed housing 230. In some aspects, the feed housing 230 includes a shroud 251 sized so as to shield features of the mount plate 226 and the feed housing 230 from view when the feed housing 230 is installed.

FIG. 7 is a partial view illustrating one of the cleats 213 and one of the lips 215 of the mounting system 200 being aligned for mounting according to certain aspects. The lip 215 can extend partially along the slot 211. For example, a first section 217 of the slot 211 may be positioned behind the lip 215 (e.g., on a side of the lip 215 facing a rear of the mount plate 226) and extend over a radial edge of the lip 215. Stated another way, the first section 217 may form an L-shape, with the leg of the L extending behind the lip 215 in a radially inward direction and with the column of the L extending over the lip 215 in an axial direction. A second section 219 of the slot 211 can be adjacent the first section 217 along a length of the slot 211 (such as along the circumference of the disk 209). The second section 219 can act as an entry portion through which the cleat 213 can initially enter the slot 211, and the first section 217 can act as a receiving portion for securing the cleat 213 upon rotation from the second section 219.

The second section 219 of the slot 211 can be sized to permit entry of the cleat 213 when the feed housing 230 is axially translated toward the mount plate 226. For example, the cleat 213 can include an axial portion 221 and a radial portion 223. The radial portion 223 can depend from the axial portion 221, e.g., so that the cleat 213 forms an L-shape with the axial portion 221 forming a column of the L and the radial portion 223 forming the leg of the L. The second section 219 of the slot 211 can have a cross-sectional opening large enough to receive the cross-sectional area of the radial portion 223 of the cleat 213 when axially translated.

The mount plate 226 and the feed housing 230 can include indicia 225 (individually shown as indicia 225A, 225B, and 225C). The indicia 225 can be used to assist a user in aligning and securing the feed housing 230 to the mount plate 226. For example, a first indicia 225A can be aligned with a second indicia 225B to align the cleat 213 with the second section 219 of the slot 211. The cleat 213 can be axially translated into the second section 219 of the slot 211 so that the feed housing 230 is in an aligned position from which rotation can shift the feed housing 230 into an installed and/or locked position. From the aligned position, the feed housing 230 can be rotated relative to the mount plate 226 (such as shown by arrow 227) to secure the cleat 213 within the slot 211. For example, the feed housing 230 can be rotated relative to the mount plate 226 by twisting at least some part of the feed housing 230 with respect to the mount plate 226 and/or by twisting at least some part of the mount plate 226 with respect to the feed housing 230.

As may be appreciated, in this and other embodiments, a mounting system (such as mounting system 200) can feature a mount (such as a mount plate 226) with structures that generally project outward from the juicer in order to receive corresponding features of a feed housing (such as feed housing 230). Such outwardly projecting structures may be easier to clean than inwardly projecting openings or other inwardly projecting features that may readily collect comestible particles in a geometry that is difficult to access. Additionally, difficult-to-clean structures can be arranged on a removable part that can be readily removed for cleaning in a dishwasher or other automated cleaning apparatus to facilitate greater ease of cleaning. For example, the feed housing 230 and/or the mount plate 226 can be readily removable from a juicer such as the juicer 100 of FIG. 1 to facilitate cleaning of the cleats 213, lips 215, recesses 211, etc. in a dishwasher.

FIG. 8 illustrates engagement of the cleat 213 and the lip 215 according to certain aspects. Rotating the feed housing 230 (e.g., according to the arrow 227) can move the cleat 213 into engagement with the lip 215 (e.g., into the first section 217 of the slot 211). For example, the L-shape of the cleat 213 can be aligned with the L-shape of the first section 217 of the slot 211 such that the radial portion 223 of the cleat 213 is behind the lip 215 and the axial portion 221 is over the lip 215. In some aspects, the lip 215 includes a ramped surface 229 to guide the cleat 213 during rotation so as to pull the cleat 213 in the axial direction toward the mount plate 226. The cleat 213 can additionally or alternatively include a ramped surface 229 (such as best seen in FIG. 6) to facilitate this function. As may be appreciated from the foregoing description, engagement of the cleat 213 and the lip 215 can lock the feed housing 230 into the installed position in response to rotation of the feed housing 230 relative to the mount plate 226. In some aspects, once the feed housing 230 is rotated, the first indicia 225A may align with a third indicia 225C to indicate that the feed housing 230 is properly or completely secured to the mount plate 226.

FIG. 9 illustrates a retention mechanism 201 of the mounting system 200 of FIG. 6 according to certain aspects. The retention mechanism 201 can include a wedge 231. The wedge 231 can be constrained by a guide 233 to be movable within a predefined range. The wedge 231 can be biased toward one end of the range by a biasing member 235 (such as a spring). The wedge 231 can be coupled with a tab 237 such that movement of the tab 237 can move the wedge 231 against the biasing force exerted by the biasing member 235. The feed housing 230 can include features for interacting with the retention mechanism 201. For example, the feed housing 230 can include a groove 239 and a notch 203. The wedge 231 can be received in the groove 239 when the feed housing 230 is aligned for installation. The wedge 231 can engage the notch 203 and act as a detent to lock the feed housing 230 into an installed position. For example, rotation of the feed housing 230 from the aligned position (e.g., in the direction shown by arrow 241) can cause the relative position of the retention mechanism 201 to change from the position shown in phantom lines in FIG. 9 to the position shown in solid lines in FIG. 9. As the feed housing 230 is rotated, the wedge 231 can engage a ramp 243 at the end of the groove 239. Movement of the wedge 231 along the ramp 243 can move the wedge 231 against the biasing force of the biasing member 235. As the feed housing 230 continues in rotation, the wedge 231 can be pushed into locking engagement with the notch 203 by the biasing force exerted by the biasing member 235. In this way, the retention mechanism 201 can prevent rotation of the feed housing 230 until uninstallation is desired. When uninstallation is desired, the tab 237 can be moved with sufficient force to overcome the biasing force of the biasing member 235 and shift the wedge 231 out of the notch so the feed housing 230 can be rotated out of the installed position.

In some aspects, a variety of features described herein can contribute to locking the feed housing 230 into the installed position in response to an installing rotation. For example, rotation can move cleats 213 relative to lips 215 along ramped surfaces so as to draw the feed housing 230 toward the mount plate 226 and increase a tightness of a seal between a ring 207 of the feed housing 230 and one or more features of the central boss 205 of the mount plate 226 (e.g., a taper and/or an O-ring), while the same rotation causes the retention mechanism 201 of the mount plate 226 to engage a the notch 203 on the feed housing 230. However, such features can be included or omitted independently of one other. Other arrangements are also possible. For example, although FIGS. 6-9 illustrate some features (such as cleats 213) on the feed housing 230 and corresponding features (such as lips 215) on the mount plate 226, arrangements in which features are reversed between the feed housing 230 and the mount plate 226 are still within the scope of the present disclosure. Additionally, although FIG. 6 illustrates three lips 215, three corresponding cleats 213, and one retention mechanism, any number of particular features may be utilized, including combinations in which multiple of one feature correspond to a common other feature (such as two cleats 213 engaging to a single lip 215). Furthermore, although some features (such as the cleats 213 and the lips 215) are shown as equally spaced apart in FIG. 6, in some aspects features can be spaced apart by non-uniform amounts.

FIG. 10 is an exploded assembly view illustrating a mount plate 326 and a feed housing 330 of another example of a mounting system 300 according to certain aspects. Similar to the mounting system 200 of FIGS. 5-9, the mounting system 300 can include a mount plate 326 with slots 311 and lips 315 for receiving cleats 313 of a feed housing 330. In contrast to the mounting system 200, the slots 311 and lips 315 in the mounting system 300 are arranged to receive cleats 313 having radial portions 323 that face away from a center of the feed housing 330, rather than toward a center of the feed housing 330.

FIG. 11 is a partial view illustrating one of the cleats 313 and one of the lips 315 of the mounting system 300 of FIG. 10 being aligned for mounting according to certain aspects. FIG. 12 illustrates engagement of the cleat 313 and the lip 315 of FIGS. 10-11 according to certain aspects. Rotating the feed housing 330 according to the arrow 327 shown in FIGS. 11 and 12 can cause the radial portion 323 of the cleat 313 to rotate behind the lip 315. A ramped surface on 329 on the cleat 313 (and/or on the lip 315) can guide the feed housing 330 axially toward the mount plate 326. In some aspects, each slot 311 can also be in fluid communication with a scupper 345 that provides an opening extending radially to an edge of the disk 309 so that at least a portion of the slot 311 is open in the radial direction. The scuppers 345 can provide an avenue for water to flow through to facilitate cleaning.

FIG. 13 is an exploded assembly view illustrating a mounting plate 426 and a feed housing 430 of a further example of a mounting system 400 according to certain aspects. As may be appreciated with respect to FIG. 13, in some aspects, a mounting plate 426 can include slots 411 or other features that extend into the mount plate 426 (e.g., rather than features such as the disk 309 of FIG. 10 that extends out of the mount plate 336 or away from the rear of the mount plate 326). Furthermore, in some aspects, a retention mechanism 401 may engage a notch 403 in a cleat 413 of the feed housing 430. In some aspects, the feed housing 430 can also include a magnet 447 detectable by a sensor 449 in the mounting plate 426. The sensor 449 may be configured to prevent rotation of a cutter (such as the cutter 128 of FIG. 2) when the magnet 447 is not detected due to the feed housing 430 not being secured in the installed position.

Other variations of mounting systems are within the scope of the present disclosure. For example, although several described mounting systems may utilize a feed housing that is rotated to engage a stationary mount plate, mounting systems may additionally or alternatively utilize a mount plate that is rotated to engage a stationary feed housing. In some aspects, a component that is rotated to cause engagement of the mount plate and the feed housing may be a subcomponent of the mount plate or the feed housing. For example, the mount plate may include a stationary central boss and a rotatable ring with lips or other features that lockingly engage cleats or other features of a feed housing as a result of the ring being rotated when the feed housing is aligned with the stationary central boss. Systems that utilize rotation to engage and/or secure the feed housing to the mount can provide advantages such as ease of installation and/or minimal amounts of alignment of features apart from the rotating movement. Additionally, although several described mounting systems may utilize relative rotation between a feed housing and a mount plate to cause engagement, mounting systems may additionally or alternatively utilize axial, lateral, and/or other relative translation to cause engagement. For example, the mount plate and/or the feed housing may include lips and/or cleats with sufficient flexibility and/or resilience (e.g., from the materials from which the lips and/or cleats are formed, and/or from complementary components utilized such hinges or biasing members) so as to flex around and/or shift into engagement with complementary features in response to the mount plate and/or the feed housing being pushing toward the other along an axis of rotation of the cutter.

FIG. 14 is a perspective view of a press chamber 166 according to certain aspects, and FIG. 15 is a partial view of one side of the press chamber 166 of FIG. 14, illustrating a guide arm 150 relative to a vertical support 118 according to certain aspects. The guide arm 150 can be attached to the platen 146 and received in a recess 199 in the third vertical support 118. The guide arm 150 can thus prevent rotation of the platen 146 when the platen 146 is being raised or lowered by the hydraulic press 142.

In some aspects, the press chamber 166 has a rectangular profile having four corners. The first vertical support 114 (FIG. 1) can be positioned adjacent the first corner, the second vertical support 116 can be positioned adjacent the second corner, and the third vertical support 118 can be positioned between the third corner and the fourth corner. The first vertical support 114 and the second vertical support 116 can be aligned along opposite ends of the sidewall 176 (FIG. 3) of the press chamber 166, and the third vertical support 118 can be positioned on an opposite side of the press chamber 166 from the sidewall and between the first vertical support 114 and the second vertical support 116. Such an arrangement can increase an amount of access into the press chamber 166, e.g., the press chamber 166 can be accessible from a lateral side from either side of the third vertical support 118. Such an arrangement can provide greater access or easier access to the press chamber 166 for accessing or removing components therein. Although illustrated herein as a "tripod" configuration with the first vertical support 114, the second vertical support 116, and the third vertical support 118, other arrangements are possible. For example, in some embodiments, the first vertical support 114 and/or second vertical support 116 may each be replaced by two vertical supports supporting a motor mount. In some aspects, the third vertical support 118 is replaced with multiple vertical supports along an end of the juicer 100 (e.g., along the right end of FIG. 1 or 3, where the third vertical support 118 is illustrated.) Using the tripod configuration illustrated in the figures may provide a balance between sufficient strength and rigidity for functions of the juicer, and simplicity of manufacture or use as a result of greater access to the press chamber 166.

Other variations are within the spirit of the present disclosure. Thus, while the disclosed aspects are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments or aspects require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A juicer comprising:
   a body having an outer housing; and
   a grinding subsystem comprising:
   a mount accessible from an exterior of the outer housing;
   a cutter disposed at least partially external to the mount;
   a feed housing releasably connectable with the mount by rotation of the feed housing relative to the mount from an aligned position to an installed position, the feed housing comprising:
   (i) a grind chamber positioned about the cutter when the feed housing is in the installed position;
   (ii) an input chute in fluid communication with the grind chamber and configured for introduction of comestibles into the grind chamber for grinding by the cutter into pulp; and
   (iii) an output chute in fluid communication with the grind chamber and configured for ejection, from the grind chamber, of pulp generated from comestibles ground by the cutter; and
   a first locking structure on the feed housing;
   a second locking structure on the mount, the second locking structure configured to engage the first locking structure so as to lock the feed housing into the installed position in response to the rotation of the feed housing about an axis relative to the mount from the aligned position to the installed position; and wherein at least one of the first and second locking structures includes a retention mechanism configured to move radially relative to said axis and engage the other one of the first and second locking structure to lock the rotation of the feed housing.

2. The juicer of claim 1, wherein the first locking structure comprises a cleat and the second locking structure comprises a lip.

3. The juicer of claim 2, wherein the cleat comprises an axially-extending segment and a radially-extending segment depending from the axially-extending segment, wherein the cleat is positioned over the lip when the feed housing is in the installed position such that the radially-extending segment of the cleat is positioned behind the lip.

4. The juicer of claim 3, wherein the radially-extending segment extends radially outward.

5. The juicer of claim 3, wherein the radially-extending segment extends radially inward.

6. The juicer of claim 3, wherein the mount further comprises a slot having an entry portion and a receiving portion adjacent the entry portion, the entry portion sized to permit entry of the radially-extending segment of the cleat when the feed housing is translated axially toward the mount into the aligned position, wherein the lip is positioned in the receiving portion such that the radially-extending segment of the cleat is pivotable from the entry portion to the receiving portion and behind the lip in response to the rotation of the feed housing relative to the mount from the aligned position to the installed position.

7. The juicer of claim 6, wherein at least a portion of the slot is open in a radially outward direction so as to facilitate access into the slot for cleaning.

8. The juicer of claim 3, wherein at least one of the cleat or the lip comprises a ramped surface configured to guide the cleat relative to the lip so as to axially draw the feed housing toward the mount in response to the rotation of the feed housing relative to the mount from the aligned position to the installed position.

9. The juicer of claim 1, wherein the second locking structure comprises a wedge biased in a radially outward direction and the first locking structure comprises a notch configured to receive the wedge.

10. The juicer of claim 1, wherein the first locking structure comprises a plurality of first locking structures spaced around the feed housing;
wherein the second locking structure comprises a plurality of second locking structures spaced around the mount; and
wherein each second locking structure of the plurality of second locking structures is configured to engage a first locking structure of the plurality of first locking structures so as to lock the feed housing into the installed position in response to the rotation of the feed housing relative to the mount from the aligned position to the installed position.

11. The juicer of claim 1, wherein the second locking structure comprises a plurality of second locking structures including (i) a wedge biased in a radially outward direction, and (ii) a lip;
wherein the first locking structure comprises a plurality of first locking structures including (i) a notch configured to receive the wedge, and (ii) a cleat, at least one of the lip or the cleat comprising a ramped surface;
wherein the mount further comprises an O-ring;
wherein the feed housing further comprises a rim; and
wherein, in response to the rotation of the feed housing relative to the mount from the aligned position to the installed position (i) the cleat is positioned over the lip so that the ramped surface guides the cleat relative to the lip so as to axially draw the feed housing toward the mount, and (ii) the wedge is received in the notch; and
wherein the rim sealingly engages the O-ring in response to the feed housing being axially drawn toward the mount by the ramped surface guiding the cleat relative to the lip.

12. The juicer of claim 1, wherein the cutter is rotatable about a horizontal axis of rotation of the cutter;
wherein the grind chamber encloses the cutter when the feed housing is releasably connected with the mount, the grind chamber having a grind chamber axis passing vertically through the grind chamber so as to divide the grind chamber into a first lateral side and a second lateral side, the grind chamber axis intersecting with the horizontal axis of rotation of the cutter when the feed housing is releasably connected with the mount so that the cutter rotates upward in the first lateral side and downward in the second lateral side when the feed housing is releasably connected with the mount; and
wherein the input chute comprises an input chute axis generally aligned along a center of the input chute, the input chute axis having a proximal end proximal to the grind chamber, the input chute axis aligned with respect to the grind chamber axis such that the proximal end of the input chute axis is laterally offset from the grind chamber axis away from the first lateral side of the grind chamber.

13. The juicer of claim 12, further comprising a pressing subsystem, comprising:
a press chamber accessible from an exterior of the outer housing;
a press plate disposed in the press chamber;
a juice tray positioned in the press chamber and opposite the press plate, the juice tray configured to receive a package comprising pulp ejected through the output chute from the grind chamber; and
a press configured to move the juice tray toward the press plate so as to compress the package between the juice tray and the press plate with sufficient force to squeeze juice from the pulp in the package into the juice tray.

14. The juicer of claim 12, wherein the proximal end of the input chute axis is laterally offset from the grind chamber axis by an amount between 30% and 135% along a spectrum in which (i) 0% corresponds to an arrangement in which the input chute axis is collinear with the grind chamber axis, and (ii) 100% corresponds to an arrangement in which an edge of the input chute laterally nearest the first lateral side of the grind chamber is intersected by the grind chamber axis.

15. The juicer of claim 14, wherein 100% on the spectrum corresponds to an arrangement in which the edge of the input chute laterally nearest the first lateral side of the grind chamber is aligned along the grind chamber axis.

16. A juicer comprising: a body having an outer housing;
a grinding subsystem comprising:
a mount accessible from an exterior of the outer housing;
a cutter disposed at least partially external to the mount; and a feed housing releasably connected with the mount, the feed housing
comprising:
(i) a grind chamber enclosing the cutter when the feed housing is releasably connected with the mount;
(ii) an input chute in fluid communication with the grind chamber and configured for introduction of comestibles into the grind chamber for grinding by the cutter into pulp; and (iii) an output chute in fluid communication with the grind chamber and configured for ejection, from the grind chamber, of pulp generated from comestibles ground by the cutter; and
a first locking structure on the feed housing;
a second locking structure on the mount, the second locking structure configured to engage the first locking structure so as to lock the feed housing into the installed position in response to the rotation of the feed housing about an axis relative to the mount from the aligned position to the installed position; and
wherein at least one of the first and second locking structures includes a retention mechanism configured to move radially relative to said axis and engage the other one of the first and second locking structure to lock the rotation of the feed housing; and
a pressing subsystem comprising:
a press chamber accessible from an exterior of the outer housing, the press chamber having a first surface, a second surface opposite the first surface, and a sidewall extending from the first surface to the second surface;
a press chamber form comprising a continuous piece of material forming at least a portion of the first surface, at least a portion of the sidewall, and a transition between the first surface and the sidewall;
a press plate disposed along the second surface of the press chamber;
a juice tray positioned in the press chamber and opposite the press plate, the juice tray configured to receive a package comprising pulp ejected through the output chute from the grind chamber; and
a press configured to move the juice tray toward the press plate so as to compress the package between the juice tray and the press plate with sufficient force to squeeze juice from the pulp in the package into the juice tray.

17. The juicer of claim 16, wherein the press chamber form further comprises the second surface of the press chamber and a transition between the sidewall and the second surface of the press chamber.

18. The juicer of claim 17, wherein the press chamber form further comprises the press plate.

19. The juicer of claim 16, further comprising a first vertical support, a second vertical support, and a third vertical support;
wherein the press chamber has a rectangular profile having four corners, the first vertical support positioned adjacent the first corner, the second vertical support positioned adjacent the second corner, and the third vertical support positioned between the third corner and the fourth corner.

20. The juicer of claim 19, further comprising:
a guide arm connected with the juice tray, wherein the third vertical support comprises a guide slot configured to receive the guide arm so as to prevent the juice tray from rotating when being moved relative to the press plate;
wherein the cutter is rotatable about a horizontal axis of rotation of the cutter, the grind chamber has a grind chamber axis passing vertically through the grind chamber so as to divide the grind chamber into a first lateral side and a second lateral side, the grind chamber axis intersecting with the horizontal axis of rotation of the cutter when the feed housing is releasably connected with the mount so that the cutter rotates upward in the first lateral side and downward in the second lateral side when the feed housing is releasably connected with the mount, and the input chute has an input chute axis generally aligned along a center of the input chute, the input chute axis having a proximal end proximal to the grind chamber, the input chute axis aligned with respect to the grind chamber axis such that the proximal end of the input chute axis is laterally offset from the grind chamber axis away from the first lateral side of the grind chamber; and
wherein the feed housing is releasably connectable with the mount by a rotation of the feed housing relative to the mount from an aligned position to an installed position, and the grinding subsystem further comprises (i) a first locking structure on the feed housing, and (ii) a second locking structure on the mount, the second locking structure configured to engage the first locking structure so as to lock the feed housing into the installed position in response to the rotation of the feed housing relative to the mount from the aligned position to the installed position.

* * * * *